(12) United States Patent
Searle

(10) Patent No.: US 7,303,197 B1
(45) Date of Patent: Dec. 4, 2007

(54) CONVERTIBLE AND COMBINED GOLF BAG, PULL CART AND STAND

(76) Inventor: Charles E. Searle, 221 Otis St., West Newton, MA (US) 02465

( * ) Notice: Subject to any disclaimer, the term of this patent is extended or adjusted under 35 U.S.C. 154(b) by 0 days.

(21) Appl. No.: 11/437,321

(22) Filed: May 19, 2006

Related U.S. Application Data

(60) Provisional application No. 60/683,272, filed on May 20, 2005.

(51) Int. Cl.
*B62B 1/00* (2006.01)
(52) U.S. Cl. .............................. 280/47.26; 280/47.23; 280/DIG. 6
(58) Field of Classification Search .......... 280/DIG. 6, 280/651, 652, 654, 655, 47.23, 47.27, 646, 280/47.315, 645, 47.26, 47.18, 47.19, 47.24, 280/47.2, 47.33; 248/98, 96, 167, 168, 169, 248/171; 224/274
See application file for complete search history.

(56) References Cited

U.S. PATENT DOCUMENTS

| | | | | |
|---|---|---|---|---|
| 4,400,006 A * | 8/1983 | Larkin | ...................... | 280/646 |
| 4,522,299 A * | 6/1985 | Clark et al. | .............. | 206/315.3 |
| 5,390,788 A | 2/1995 | Schenkkan | | |
| 5,435,546 A * | 7/1995 | Rao | ........................... | 224/274 |
| 5,437,423 A | 8/1995 | Sinclair | | |
| 5,823,485 A | 10/1998 | Park | | |
| 6,007,031 A * | 12/1999 | Tang | .......................... | 248/96 |
| 6,050,592 A * | 4/2000 | Kim | .......................... | 280/652 |
| 6,056,301 A * | 5/2000 | Berliner et al. | ............ | 280/43.1 |
| 6,168,123 B1 | 1/2001 | Stein et al. | | |
| 6,186,522 B1 * | 2/2001 | Weis | .......................... | 280/37 |
| 6,296,116 B1 | 10/2001 | Schmidt et al. | | |
| 6,427,954 B1 | 8/2002 | Sundara et al. | | |
| 6,561,527 B2 | 5/2003 | Spadino | | |
| 6,802,515 B2 * | 10/2004 | Sorenson et al. | ........ | 280/47.26 |
| 6,874,798 B2 * | 4/2005 | Kang | ..................... | 280/47.18 |
| 6,979,019 B2 * | 12/2005 | Chen | .......................... | 280/652 |
| 6,988,738 B2 * | 1/2006 | Lu | ........................... | 280/47.26 |
| 7,080,732 B2 * | 7/2006 | Bonfanti | .................. | 206/315.3 |

* cited by examiner

*Primary Examiner*—J. A Shriver
(74) *Attorney, Agent, or Firm*—Robert C. Montgomery

(57) ABSTRACT

The innovative apparatus is a portable and convertible golf club bag that combines the usefulness of a conventional golf club bag with that of a golf bag pull cart and a golf club stand. In each configuration, the apparatus would capably serve the function intended. The apparatus would allow a golfer to elect to place the golf bag upon a conventional riding golf cart to ride during a round, to convert it to a golf bag with a pull cart for walking the course, or to select a stationary stand position for practicing. All components necessary to convert the apparatus for each task and configuration would be integral to the apparatus.

6 Claims, 2 Drawing Sheets

CONVERTIBLE AND COMBINED GOLF BAG, PULL CART AND STAND

RELATED APPLICATIONS

The present invention was first described in Disclosure Document No. 565,509 filed on Nov. 23, 2004 and U.S. Provisional Patent Application No. 60/683,272 filed on May 20, 2005.

FIELD OF THE INVENTION

The present invention relates generally to a golf club bag and, more particularly, to said golf bag having the additional functionalities of both a pull cart and a golf bag stand.

BACKGROUND OF THE INVENTION

Having attained the status as one of the leading leisure time outdoor sporting activities in America, the game of golf enlists participants of all ages. Many golfers enjoy both the fresh air as well as the physical activity of walking several miles. Many golfers, however, have trouble carrying their clubs, bag and other equipment over the golf course, being encumbered by the weight. As a result, many choose to use battery operated riding carts or wheeled pull carts to minimize the amount of exertion experienced. These devices, however, have certain drawbacks. Driving carts eliminate much of the exercise involved in playing golf and pull carts are unnecessarily cumbersome, taking up a great deal of storage space and being difficult to handle. Accordingly, there is a need for a means by which one can partake in a round of golf and gain the exercise benefits it offers, while avoiding the aforementioned drawbacks associated therewith. The development of the invention herein disclosed fulfills this need.

The new and novel apparatus combines the functionality of a conventional golf bag with that of a pull cart in a single unit that eliminates the bulk often associated with conventional pull cart designs. Having the outward appearance of a typical golf bag, the novel apparatus includes retractable wheels in combination with a telescoping handle that allow the bag to be towed along as the golfer walks. The wheels are stored within integral recesses in the body of the bag, but will fold down and out when the pull handle is extended. When in the extended pull cart configuration, the wheels, in combination with the bag, act as a tripod to support the bag allowing the apparatus to stand unassisted. Further, the innovative apparatus is provided with carrying straps, exterior pockets and other such features as normally found on any golf club bag.

No prior art was found that particularly describes an apparatus that satisfies the identified needs of a traditional golf club bag, a bag pull cart and a golf bag stand combined in a single unit that would permit a golfer the flexibility of use without the necessity of acquiring three separate devices.

SUMMARY OF THE INVENTION

In view of the disadvantages inherent in the prior art, it has been observed that there is need for a golf club bag to also have the functionalities of a pull cart and a club bag stand.

The object of the present invention is to provide a conventional carrier and storage bag for a set of golf clubs that can be sufficiently compact for strapping onto a battery operated golf cart while riding and playing golf.

A further object of the present invention is the ability to convert the apparatus to a wheeled pull cart with a telescopic handle to transport the gold clubs residing in the bag while walking and playing golf.

A further object of the present invention is the ability to convert the apparatus to a golf bag stand for use when practicing golf.

A further object of the present invention is the ability to convert the apparatus to encompass multiple functionalities as described into a golf bag without distorting the look and usefulness of a standard golf club bag.

A further object of the present invention is the ability to convert the apparatus to make converting the functionalities of the golf bug bag, pull cart and stand without undue stress or strain upon the golfer.

To achieve the above and other objectives, the present invention provides for an apparatus that combines the functionality of both a conventional golf bag and a pull cart in a single unit that eliminates the bulk often associated with conventional pull cart designs. Having an outward appearance of a typical golf bag, the unique golf bag apparatus includes retractable wheels in combination with a telescoping handle that allow the bag to be towed along as the golfer walks. The wheels are stored within integral recesses in the body of the bag, and fold down and out when the pull-along handle is extended. When extended, the wheels, in combination with the bag, act as a tripod to support the bag and allow it to serve as a golf bag stand. The invention is provided with carrying straps, exterior pockets and other such features as found on a regular golf club bag. As a result, use of the invention allows the golfer to gain all of the exercise benefits of walking and playing golf while relieving him or her from the burdens associated with carrying a golf bag.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
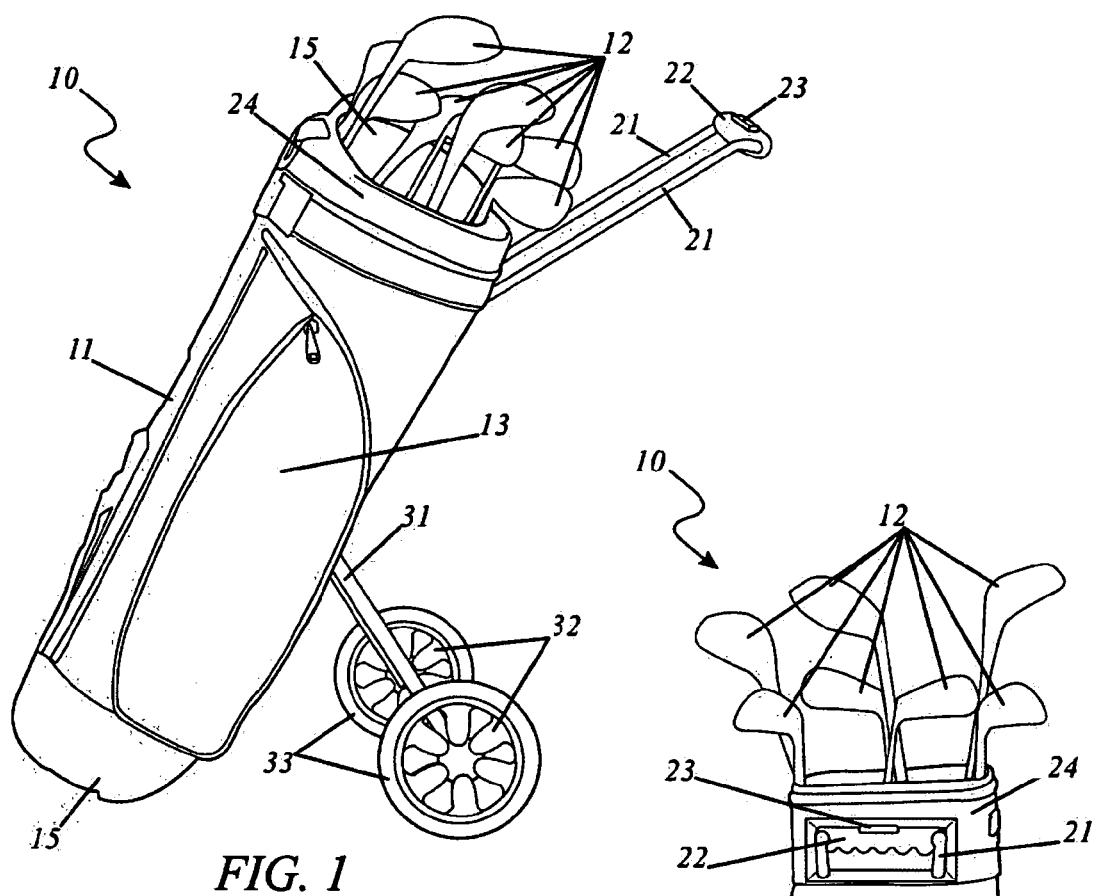
FIG. 1 is front elevation view of the golf bag with integral pull cart 10 in an extended orientation, according to a preferred embodiment of the present invention; and, FIG. 2 is a side view of the golf bag with integral pull cart 10 in a retracted orientation, according to a preferred embodiment of the present invention, and, FIG. 3 is an internal side view of the golf bag with integral pull cart 10 in the extended orientation, according to a preferred embodiment of the present invention; and, FIG. 4 is an internal side view of the golf bag with integral pull cart 10 in the retracted orientation, according to a preferred embodiment of the present invention.

DESCRIPTIVE KEY 10 golf bag with integral pull cart
11 fabric cover
12 golf club
13 pocket
14 wheel compartment
15 inner shell
21 shaft
22 handle grip
23 button for locking mechanism
24 cowling 31 elongated member
32 wheel
33 tire
40 wheel axle
50 connection bar
55 transverse member
60 track plate assembly
65 channel
70 anchor
80 door

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an improved golf bag apparatus including a means to transform it into a pull cart 10. The golf bag with integral pull cart (herein described as the "apparatus") 10 comprises a conventional golf bag, a retractable handle assembly, and a retractable wheel assembly coupled to said handle assembly.

Figure 2:
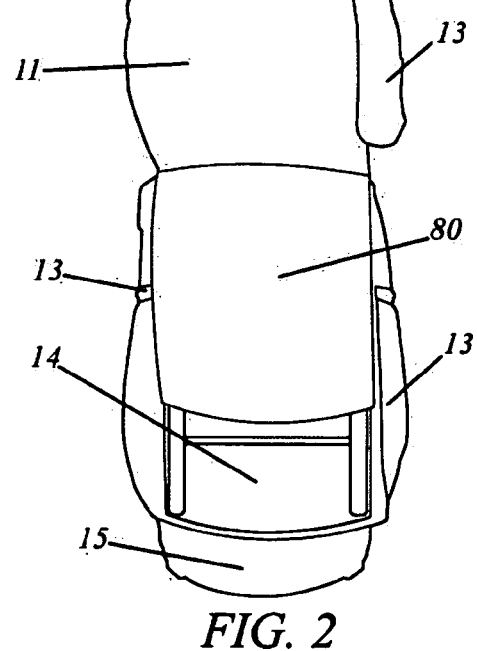

Referring now to FIGS. 1 and 2, views of the apparatus 10, according to the preferred embodiment of the present invention, are disclosed. A conventional golf bag, generally comprising an opened upper end and a closed lower end, is provided wherein it comprises a hard and durable shell 15 with an open end and a closed end. Golf clubs 12 are placed within the open end of the golf bag, separated by a divider unit and are retained within the shell 15. A fabric cover 11, with or without a shoulder strap, preferably made of a durable material with zippered pockets 13, covers said inner shell 15. Circumferentially disposed about the open end is a cowling 24 with a first diameter matching that of the inner shell 15 and a second diameter slightly larger than the first. Within the cowling 24, resting on the lower lip, is a retractable handle assembly comprising a handle grip 22 with a release button 23 and two (2) lightweight shafts 21 extending downward into the cavity between the fabric cover 11 and inner shell 15 and attached to said shell 15 via a clamping mechanism (not shown) and locked into place via a locking mechanism (not shown), which is actuated via a spring-loaded button 23 or other mechanical device.

The handle assembly is preferably, but not essentially, coupled to a dual wheel assembly comprising two (2) heavy-duty wheels 32 rotatably connected to two (2) elongated members 31. The wheels 32 are retractably disposed within the apparatus 10 in a retracted or closed orientation (see FIGS. 2 and 4) enclosed by a door 80, preferably made of rigid plastic. The door 80 is envisioned to move upwardly to the "open" position by use of a track (not pictured), similarly the door 80 moves downwardly to the "closed" position by use of said track. While the door 80 is in the open position, the wheel assembly is exposed. The wheels 32 are preferably of a large diameter with heavy-use tread tires 33 to successfully navigate difficult terrain, having a wheel axle 40 disposed therebetween each wheel 32. The wheels 32 are rotatably attached thereto said axle 40 with a fixed axis of rotation to permit rolling of said wheels 32.

Figure 3:
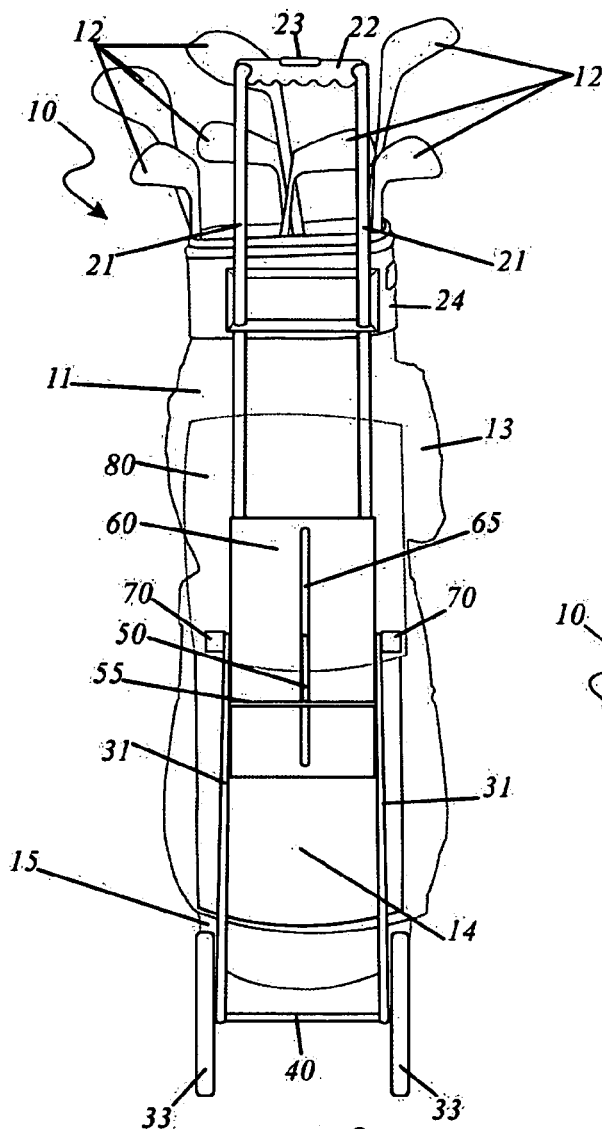
Figure 4:
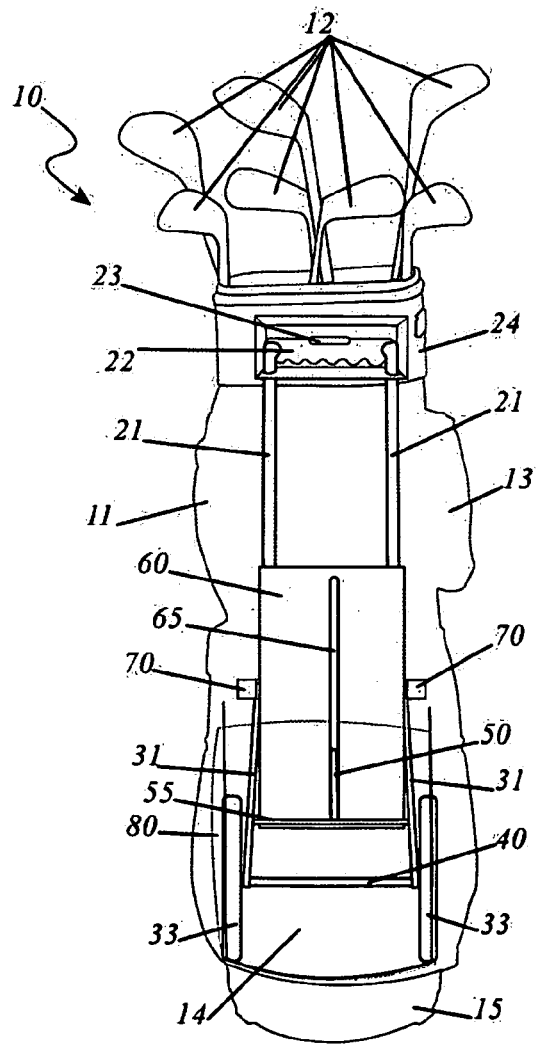

Referring now to FIGS. 3 and 4, internal views of the apparatus 10, in the extended and retracted orientation according to the preferred embodiment of the present invention, are disclosed. The handle and wheel assemblies are coupled such that they can be movably extended from the respective retracted orientation into their corresponding extended orientation. The extension of said handle assembly causes an automatic response in the form of forward pivotal movement of the wheel assembly, while retraction of the handle assembly similarly returns the wheel assembly to the retracted orientation within the apparatus 10. When the handle assembly is fully extended, the wheel assembly also fully extends outward from the golf bag body. During full extension, both the handle assembly and wheel assembly are locked or latched into place, respectively. When the wheel assembly is fully retracted, it rests within a wheel compartment area 14 within the cavity between the fabric cover 11 and inner shell 15.

The handle assembly provides retractable and extendable qualities having two (2) lightweight shafts 21 in a parallel arrangement thereof connected at a distal end by handle grip 22. A plurality of conventional lock-stop positions permit a user to adjust the length of the handle 22 relative to the apparatus 10 providing a desired shaft 21 length for various loads without having any heel-to-golf bag contact. The lock-stop positions are envisioned to provide intermediate orientations as well as the fully extended and fully retracted orientations. The release button 23 is utilized to slidably move the handle assembly from an engaged orientation, retracted, extended, or one of a plurality of intermediate orientations therebetween. The shafts 21 freely move upwardly and/or downwardly to a plurality of locations while the release button 23 is depressed inwardly.

As depicted in FIGS. 2 through 4, the handle grip 22 is positioned in the rear of the bag and is not completely flush with the surface when the handle assembly is fully inserted therewithin in the retracted orientation. As depicted in FIGS. 3 and 4, the shaft 21 is slidably received therewithin a track plate assembly 60. The track plate assembly 60 resides within the apparatus 10, and is secured to an inner wall. The shafts 21 slidably move upward and downward within said track plate assembly 60, separated by "clicks", until a desirable position is acquired and affixed into position thus providing the handle assembly at a desirable position.

The wheel assembly comprises two (2) elongated members 31 that are pivotable about the rear surface having a "U" shape interconnected with an axle 40 incorporated at the distal end thereof. The elongated members 31 are pivotally secured to the rear surface by an anchor mechanism 70, as depicted in FIGS. 3 and 4. The elongated members 31 are interconnected therewith the shafts 21 via a connection bar 50 positioned at the lower portion thereof. The connection bar 50 is pivotally connected thereto a transverse member 55 at the distal end secured to the two (2) elongated members 31. The connection bar 50 is pivotally connected thereto the shafts 21 at the proximal end via a linkage bar (not pictured). The track plate assembly 60 is defined as a plate with a vertically oriented central channel 65 for enabling movement of the connection bar 50 upward or downward movement within said channel 65. When the wheeling assembly is in the extended orientation, with the apparatus 10 tilted backwardly, the apparatus 10 is self-supporting in a tripod stance upon the surface to be traveled upon. During travel, the apparatus 10 is fully tilted backward such that the tires 33 of the wheel assembly remain in engagement with the ground in a readily stable stance capable of resisting overturning forces.

An alternate embodiment of the present invention 10 may disclose various modifications to the wheel assembly such that the elongated members 31 and the rotatable axle 40 can be of various dimensions with the option of having the elongated members 31 separated at various distances. Further, the apparatus 10 may have the option of having a number of casters or wheels 32 rotatably installed thereupon the wheel assembly.

Another alternate embodiment of the present invention 10 may disclose a flush-fitting handle assembly. Further, the handle assembly may comprise telescopic shafts 21 that are collapsible; each within itself.

The preferred embodiment of the present invention is designed to be used by the common consumer with little or no special skills, prior experience, or minimal training being necessary. Upon procurement of the golf bag with pull cart 10, the user can immediately intuit that this golf bag has far greater functionality than a conventional golf bag. The lightweight golf bag is essentially of the same design, shape, and size as a conventional golf bag, with a few unique characteristics that enable it to function also as a pull cart. During use, the golfer stands the golf bag in the upright position, with the closed end engaging the ground. Within the top cowling 24 of the golf bag, an angled handle with a grip 22 extends downward within the cavity between the inner shell 15 and fabric cover 11 and is coupled to the wheel assembly. When the button 23 on the handle 22 is depressed, a locking mechanism is released, enabling the golfer to pull the handle assembly upward to a second locked orientation. During this act, the connection bar 50 exerts an upward force thereon the connected transverse member 55, thereby causing pivotal deployment of the wheel assembly outward from the cavity of the bag and it also locks into place when the handle assembly is fully extended, thereby creating a tripod stance. Likewise, when the button 23 on the handle 22 is depressed, a locking mechanism is released, enabling the golfer to push the handle assembly downward to restore the shafts 21 and the wheel assembly to the retracted orientation. When the handle and wheel assembly is fully extended, the golfer merely tips the bag backward until the tires 33 engage the ground and they pull the bag behind them as they walk. The wheels 32 are of sufficient size and are geometrically aligned with the golf bag to provide adequate balance and support. When the destination is reached and the golfer desires to stand the golf bag again in the upright position, the button 23 is once again depressed to unlock the handle assembly and the golfer retracts the handle assembly into the golf bag cavity, with the coupled wheel assembly retracting into its wheel compartment area 14. The wheel compartment area 14 has means to cover and protect the wheels from dirt or damage in the form of a door 80 (see FIG. 2). An alternate embodiment for the wheel storage compartment area 14 could be found a variety of styles and materials including, but not limited to: a molded compartment.

The configuration of the described device allows the golfer to comfortably maneuver their golf bag across any type of terrain. Also, the size and shape of the golf bag with integral pull cart 10, along with its relative weight, enable it to be treated as a conventional golf bag, whether it is carried via a shoulder strap or in the back of a motorized golf cart. Further, the combination golf bag and integral pull cart 10 results in only a slight increase in dimensions allowing it to be stored or hauled in a similar manner as that of any conventional golf bag.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, to thereby enable others skilled in the art to best utilize the invention and its various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A portable golf club bag, bag stand, and pull cart assembly comprising:

a top open-ended bag having a plurality of pockets, a wheel compartment, a cowling, an inner shell, and a cover circumscribing said inner shell and defining a cavity therebetween;

a handle assembly having a pair of telescopically elongate shafts connected at a top position with a handle grip having an integral button actuating a locking mechanism for said handle assembly and at a bottom position with a linkage bar connected transversely to each shaft and a centrally located connection bar projecting outwardly therefrom;

a track plate assembly comprised of a rectangular plate with means to adjustably receive both said shafts of said handle assembly and a vertically oriented central channel for permitting vertical movement of said connection bar; and, a wheel assembly having a pivoting mechanism to manipulate said wheel assembly in either an extended or a retracted position, said pivoting mechanism having two elongated members pivotally joined together at an upper portion with a transverse bar fixedly connected to said connection bar of said handle assembly and at a lower position by a wheel axle, said pivoting mechanism housed within said wheel compartment of said bag, and a pair of wheels and tires.

2. The assembly of claim 1, wherein said two elongate members of said pivoting mechanism of said wheel assembly is pivotally secured to a rear surface of said bag via an anchoring mechanism.

3. The assembly of claim 1, wherein said pair of wheels and tires each are of a suitable resiliency and size to traverse rough terrain as is commonly encountered on a golf course.

4. The assembly of claim 1, further comprising a latching mechanism to fix said wheel assembly in either said extended or retracted position.

5. The assembly of claim 1, wherein said handle is angled outward away from said cowling and has a molded hand grip thereon.

6. The assembly of claim 1, wherein said wheel compartment is accessed via a door on a pair of vertically disposed tracks securely located on opposite ends of said wheel compartment, said tracks enable said door to vertically slide up in an open position and own in a closed position, said door has a latching mechanism for retaining said door in an open position.

* * * * *